June 29, 1965 J. M. EITEL 3,191,716
MOBILE LIFTING EQUIPMENT
Filed Dec. 10, 1962
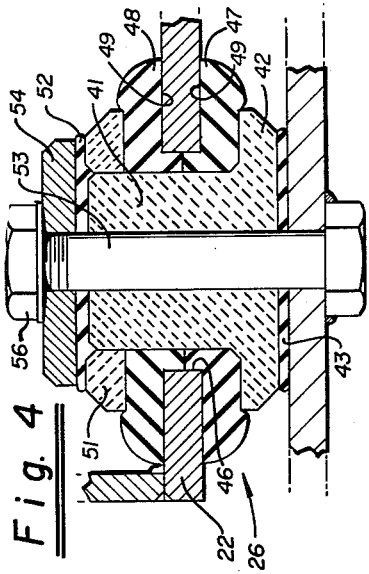
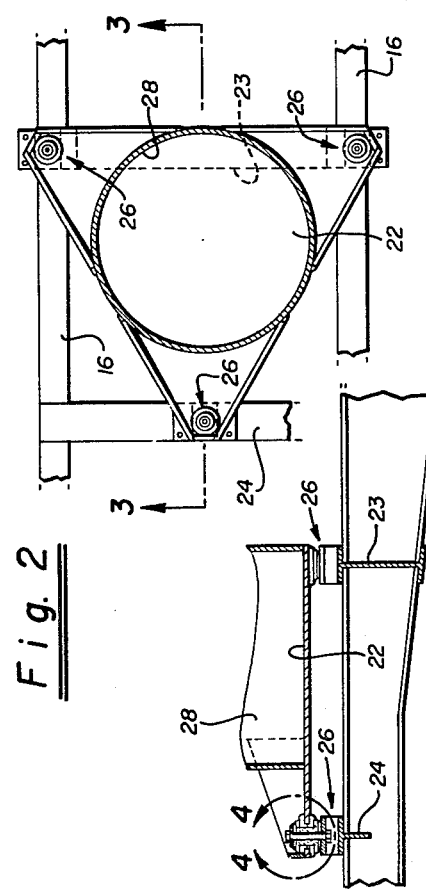
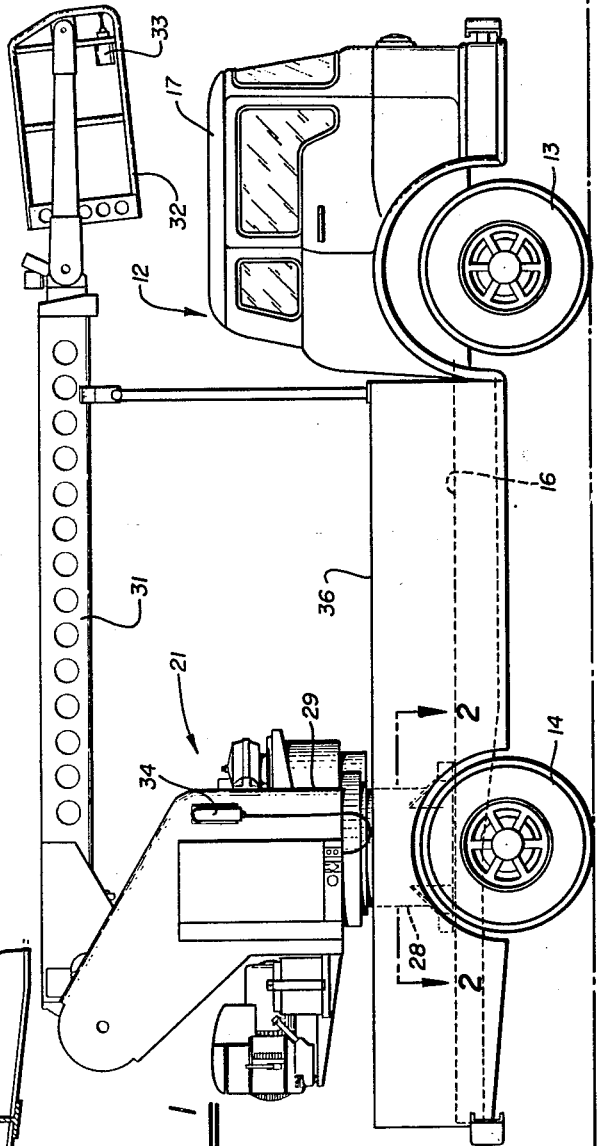
INVENTOR.
Jay M. Eitel
BY
Attorneys

United States Patent Office 3,191,716
Patented June 29, 1965

3,191,716
MOBILE LIFTING EQUIPMENT
Jay M. Eitel, San Carlos, Calif., assignor to Telsta Corp., San Carlos, Calif., a corporation of California
Filed Dec. 10, 1962, Ser. No. 243,275
2 Claims. (Cl. 182—46)

This is a continuation-in-part application of my application Serial No. 121,535, filed July 3, 1961.

This invention relates to a mobile lifting equipment and more particularly to a novel mounting for lifting equipment which is particularly adapted to be mounted on a wheeled vehicle.

In the utilization of lifting equipments, there is always the danger that the boom structure will come in contact with secondary and primary power distribution lines and thus would kill or seriously injure anyone coming in contact with the vehicle carrying the lifting equipment when it is in contact with such lines. Attempts have been made to solve this problem by providing fiberglass booms, fiberglass workman's baskets and the like. However, up to the present time such types of construction have been relatively expensive and have certain structural limitations. There is therefore a need for a new and improved lifting equipment which can be utilized without danger in the vicinity of power lines carrying low and high voltages.

In general, it is an object of the present invention to provide a lifting equipment which can be utilized in the vicinity of secondary and primary power distribution lines without endangering ground personnel coming in contact with the lifting equipment.

Another object of the invention is to provide a lifting equipment of the above character in which the lifting equipment is insulated from the vehicle carrying the lifting equipment.

Another object of the invention is to provide a lifting equipment of the above character which can be readily insulated for very high voltages.

Another object of the invention is to provide a lifting equipment of the above character in which relatively heavy loads can be carried by the lifting equipment with a substantial margin of safety.

Another object of the invention is to provide a lifting equipment of the above character which will not place undue stress upon the frame of the vehicle.

Additional objects and features of the invention will appear from the following description in which the preferred embodiment is set forth in detail in conjunction with the accompanying drawings.

Referring to the drawings:

FIGURE 1 is a side elevational view of a lifting equipment incorporating my invention.

FIGURE 2 is a cross sectional view taken along the line 2—2 of FIGURE 1.

FIGURE 3 is a cross sectional view taken along the line 3—3 of FIGURE 2.

FIGURE 4 is an enlarged cross sectional view of one of the mountings for connecting the lifting equipment to the frame of the vehicle.

The movable lifting equipment shown in FIGURE 1 of the drawings is similar to the lifting equipment shown in my copending application Serial No. 121,535, filed July 3, 1961. It consists generally of a wheeled vehicle 12 which is provided with front and rear wheels 13 and 14. The vehicle also includes a pair of laterally spaced longitudinal frame members 16 which are supported by the front and rear wheels 13 and 14. A cab 17 is mounted on the front end of the vehicle and encloses a motor (not shown) for propelling the vehicle.

A lifting equipment 21 of the type described in my copending application Serial No. 121,535, filed July 3, 1961, is mounted upon the longitudinal frame members 16. This lifting equipment includes a triangularly shaped bed plate 22 which is mounted upon cross members 23 and 24 secured to the longitudinal frame members 16 by mounting assemblies 26 of the type hereinafter described.

The lifting equipment 21 also includes a cylindrical riser 28 which is secured to the bed plate 22. A lift supporting structure 29 is mounted upon the riser 28 for rotation about a vertical axis. As disclosed in my copending application Serial No. 121,535, filed July 3, 1961, means is provided for rotating the lift supporting structure relative to the cylindrical riser. The lifting equipment 21 also includes an extensible boom structure 31 which is pivotally mounted on the lift supporting structure 29 for raising and lowering the outer end about a horizontal axis. A workman's basket 32 is pivotally carried by the outer end of the boom structure and includes a control switch 33. As explained in my copending application Serial No. 121,535, filed July 3, 1961, this control switch can be utilized for rotating the lift supporting structure 29, raising and lowering the outer end of the boom structure 31 about a horizontal axis and for extending and retracting the boom structure. A control box 34 is provided on the lift supporting structure to make possible the same operations from the ground or from the platform 36 provided on the rear portion of the longitudinal frame member 16.

A detailed cross sectional view of one of the mounting assemblies 26 is shown in FIGURE 4. As shown therein, this mounting assembly consists of a large ceramic insulator 41 which is provided with a lower radially extending flange 42. The ceramic insulator 41 is formed of an insulating material which has excellent insulating qualities and which is also relatively strong in compression as for example an aluminum oxide.

The large insulator 41 is seated upon a large washer 43 of a suitable resilient material such as neoprene. This washer rests upon the upper flange of the longitudinal frame member 16.

The triangular base plate 22 is provided with relatively large holes 46 which are adapted to fit over the top of the insulator 41. The base plate is supported upon each of the insulators 41 by a large body of resilient material in the form of a pair of very large grommets 47 and 48 of a suitable resilient material having good insulating qualities such as neoprene. The grommets are provided with annular recesses 49 which are adapted to receive the margins of the base plate 22 which define the openings 46. A ceramic washer 51 is positioned over the top of the upper grommet 48 and over the top of the insulator 41. A washer 52 of suitable resilient material such as neoprene is mounted over the ceramic washer 51 and the ceramic insulator 41.

This entire assembly consisting of the washer 43, the insulator 41, the grommets 47 and 48 and the washers 51 and 52 are placed under compression by a large thru bolt 53 which extends upwardly through the frame 16 through openings provided in the washer 43, the insulator 41, and the washer 52. It also extends through a large metal washer 54 which overlies the washer 52. A nut 56 is threaded onto the bolt 53 to obtain the desired amount of compression.

With this construction, it will be noted that the base plate 22 is electrically insulated from the frame 16 by the insulating member 41 and by the resilient insulating material forming the grommets 47 and 48. It is readily apparent that the desired amount of insulation can be readily obtained by increasing the size insulator when protection against higher voltages is desired. Thus, for example, it is relatively easy to insulate the lift supported structure and the boom structure carried thereby from the frame 16 for 69 kv. It also is relatively easy to insulate for 110 kv. or even 220 kv. in a similar manner. By providing such high values of insulation between the supporting structure and the vehicle itself, the lifting equipment can be utilized with safety in and around the secondary and primary power distribution lines without endangering ground personnel who might come in contact with the vehicle during the time the lifting equipment may be in contact with the power line.

By the utilization of thru bolts 53, the insulator 41 is placed under compression which makes it possible to carry very large loads with the lifting equipment with a substantial margin of safety without danger of crushing the ceramic insulator. Also with the construction shown, it will be noted that the insulator 41 and the washer 51 are isolated from the frame members 16, 23 and 24 and from the base plate 22 for the lifting equipment by the resilient members 43, 47, 48 and 52. Thus, shock loads, vibration and twisting of the frame members or base plate are isolated or insulated from the insulators 41 and 51 and therefore there is much less likelihood of cracking or breaking the insulators while using the lifting equipment for lifting heavy loads or while operating the vehicle on the highway or on rough terrain.

It will be noted that a three point mounting has been utilized for the base plate 22. As pointed out in my copending application Serial No. 121,535, filed July 3, 1961, this prevents the formation of an X-member in the frame of the vehicle which would have a tendency to to cause the frame to break up during operation of the vehicle. In addition this three point support eliminates twisting of the insulators. If desired, torsion bars of the type described in my copending application Serial No. 121,535, filed July 3, 1961, can be incorporated on the lifting equipment to minimize twisting of the frame members as the lifting equipment is utilized.

It is apparent from the foregoing that I have provided a new and improved lifting equipment which greatly increases the safety of use of the lifting equipment in and around primary and secondary power distribution lines. The lifting equipment is still capable of lifting relatively heavy loads and performing its normal functions.

I claim:

1. In a mobile lifting equipment, a wheeled vehicle having a frame, a base plate, a lift mounted upon the base plate, the lift including a boom structure, insulator means for securing the base plate to the frame and for electrically insulating the base plate from the frame, and resilient means mounted between the frame and the insulator means and between the base plate and the insulator means to minimize the transfer of shock and vibration forces to the insulator means, said means for supporting the base plate includes at least three mounting assemblies for securing the base plate to the frame, each of the mounting assemblies comprising an insulator extending through a hole in the base plate, resilient means mounted upon the insulator for supporting the marginal portion of the base plate and defining the hole and means for placing the insulator and the resilient means under compression.

2. A mobile lifting equipment as in claim 1 together with a workman's basket mounted on the outer end of the boom structure.

References Cited by the Examiner
UNITED STATES PATENTS

| | | | |
|---|---|---|---|
| 1,026,380 | 5/12 | Brooks | 182—46 |
| 1,478,793 | 12/23 | Osborne | 182—67 |
| 1,648,875 | 11/27 | Griese | 248—9 |
| 2,064,121 | 12/36 | Jenner | 189—27 |
| 2,520,757 | 8/50 | Cain | 248—22 |
| 2,766,163 | 10/56 | Swartz | 248—22 |
| 2,988,163 | 6/61 | Foley | 182—2 |
| 3,035,799 | 5/62 | Pierce | 248—15 |
| 3,108,656 | 10/63 | Asplundh | 182—2 |

HARRISON R. MOSELEY, *Primary Examiner.*

CHARLES O'CONNELL, *Examiner.*